July 19, 1966  G. A. GOODING  3,262,083
APPARATUS FOR ELECTRICAL RACEWAY AND DECORATIVE MOULDING
Filed Oct. 8, 1965  2 Sheets-Sheet 1
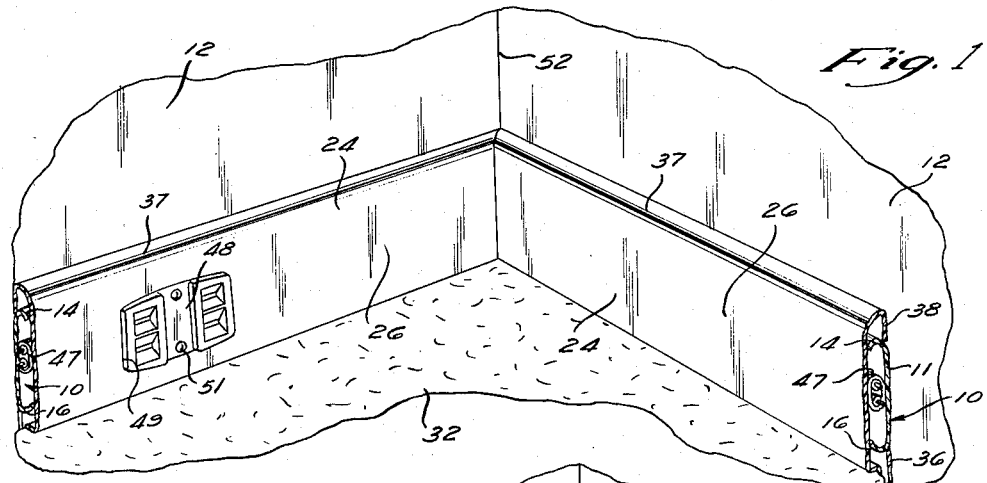
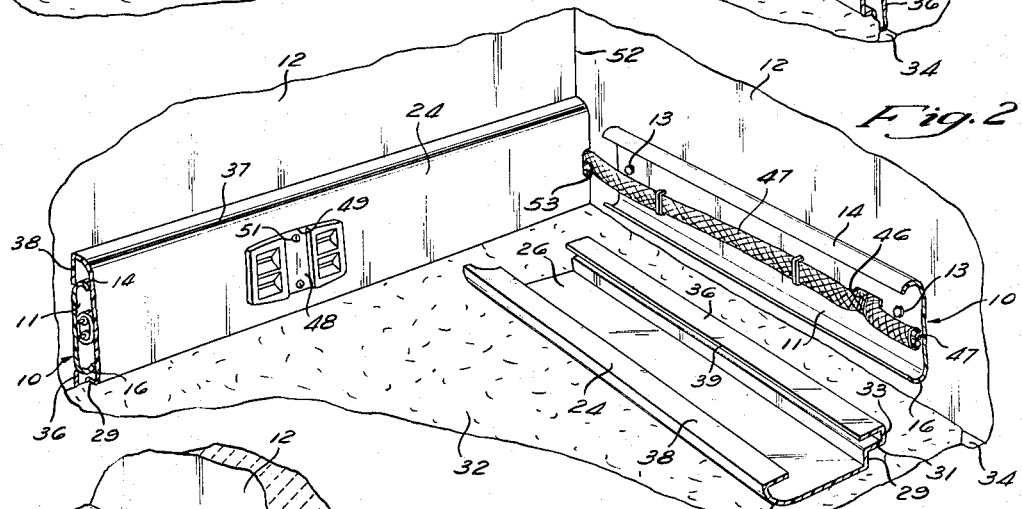
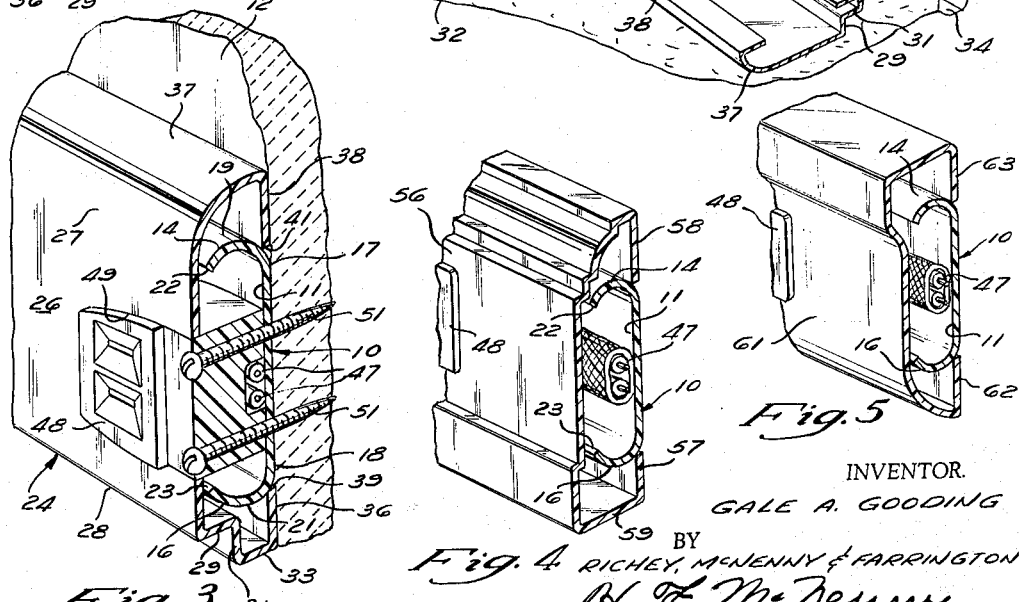
INVENTOR.
GALE A. GOODING
BY RICHEY, McNENNY & FARRINGTON
W. F. McNenny
ATTORNEYS July 19, 1966   G. A. GOODING   3,262,083
APPARATUS FOR ELECTRICAL RACEWAY AND DECORATIVE MOULDING
Filed Oct. 8, 1965   2 Sheets-Sheet 2
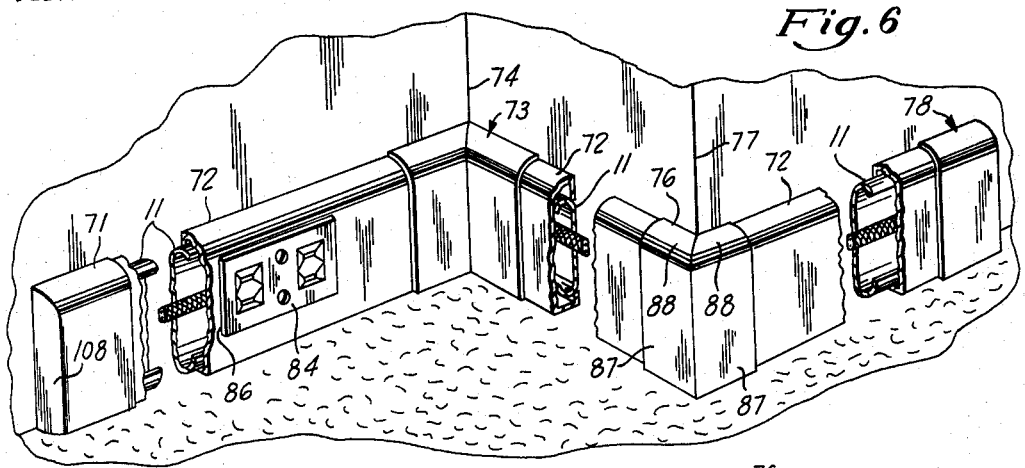
*Fig. 6*
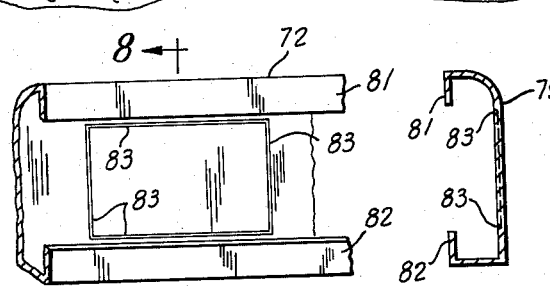
*Fig. 7*   *Fig. 8*
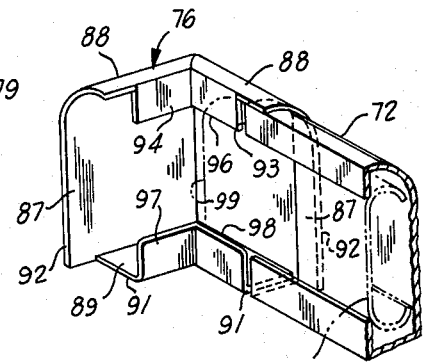
*Fig. 9*
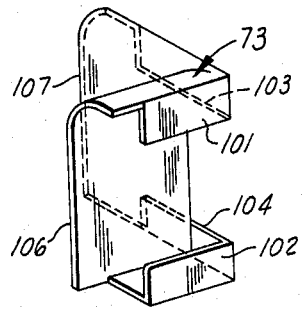
*Fig. 10*
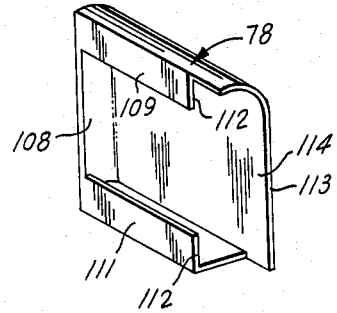
*Fig. 11*
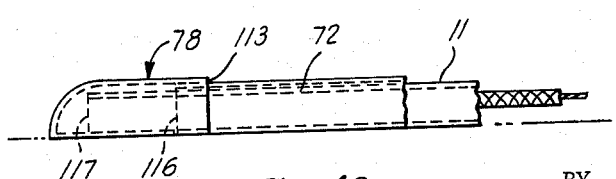
*Fig. 12*
INVENTOR
GALE A. GOODING
BY McNENNY, FARRINGTON, PEARNE & GORDON
ATTORNEYS United States Patent Office 3,262,083
Patented July 19, 1966

3,262,083
APPARATUS FOR ELECTRICAL RACEWAY
AND DECORATIVE MOULDING
Gale A. Gooding, Middlefield, Ohio, assignor to Johnson
Plastic Corporation, Chagrin Falls, Ohio, a corporation
of Ohio
Filed Oct. 8, 1965, Ser. No. 498,202
10 Claims. (Cl. 339—23)

This is a continuation-in-part of my copending application for United States Letters Patent Serial No. 281,690, filed May 20, 1963. This invention relates generally to electrical wiring systems and more particularly to a novel and improved electrical raceway and decorative moulding suitable for use in all types of buildings.

An electrical raceway, according to this invention, includes a retaining clip adapted to be mounted on the surface of a wall and an ornamental cover member proportioned to be installed against the wall by snapping the cover member over the retaining clip. Preferably, both the retaining clip and cover member are formed of a rigid plastic having sufficient resiliency to permit the snapping of the cover member into position while providing a tough, substantially mar proof, easily cleaned attractive surface. A rigid vinyl compound, particularly suited for the raceway, is marketed by the B. F. Goodrich Company and designated as GEON 8700A. This material provides the above mentioned properties and is easily extruded to substantially any desired shape.

The installation of the raceway incorporating this invention is easily accomplished. The retaining clip is first fastened to the surface of the wall by any suitable means, such as staples, nails or screws. The wire is then strung along the retaining clip and is preferably stapled in place. The lengths of face member, which may be in the shape of a baseboard of any desired profile or a chair rail of suitable profile, are then cut to length and provided wth openings for the electrical outlets at the desired locations. The outlets are then connected to the conductors adjacent to the position of the openings and the face plate is snapped over the retaining clip with the face of the electrical outlets projecting through the previously cut openings, providing exact location of the outlets. The outlets are screwed to the retaining clip while they are held in position by the facing member, thus completing the installation.

It is a simple matter to remove the face member by snapping it off the retainer clip to provide complete access to the wiring itself. This permits easy repair of any faulty wiring or modification of the wiring to add additional outlets or the like. Further, the raceway provides sufficient room to permit the addition of antenna leads for television or supplemental circuits. After the wiring is modified the face member is again snapped in place, completely concealing the wiring and again providing the decorative function. Since the raceway can be opened, the wiring and outlets should be of the surface wiring type.

Because the wiring is accessible and not contained within the wall structure the wiring can be installed and inspected after carpenters, masons and other subcontractors have completed the building. Also a raceway incorporating this invention is particularly suitable for prefabricated units since it permits such builders to complete the construction of the interior walls at the factory and then install the wiring when the building is erected. The raceway is also ideal for office buildings and the like where modification of the wiring and telephone locations occur frequently due to changes in the office arrangements. Further, the raceway is particularly desirable for remodeling or other home improvement projects since the installation cost is greatly reduced.

The cost of the raceway is also low since it is formed by extrusion. Preferably a thermo-plastic hot melt is forced through a forming die and then cooled by air jets and water. The formed parts are then merely cut to length, inspected and packed. The plastic used to form the cover member may be colored so that the cover member need not be painted and provides a permanent finish. However, if desired, the cover member can be painted during the usual decorating of the room. Because this member is formed by extruding it is a simple matter to provide substantially any decorative shape desired.

It is an important object of this invention to provide a novel and improved electrical raceway which is easily installed with a minimum use of special tools and the like.

It is another important object of this invention to provide a novel and improved electrical raceway having a cover member which fits tightly against the wall structure on both its upper and lower edges completely concealing the mounting or retaining clip so that a smooth uninterrupted surface is provided.

It is still another important object of this invention to provide a novel and improved electrical raceway comprising a mounting clip easily mounted on the surface of a wall on which a cover member is installed by merely snapping the member into position, completely concealing the mounting clip and the distribution wiring.

It is still another object of this invention to provide a novel and improved electrical raceway formed of extruded plastic which provides a permanent substantially damage proof decorative surface.

It is still another object of this invention to provide a novel and improved electrical raceway which is easily installed and which can be easily opened to provide access for repair or modification of the wiring.

It is still another object of this invention to provide a novel and improved electrical raceway utilizing a standard retaining clip compatible with a variety of cover members which can be shaped for decorative baseboard installations or chair rail installations.

It is still another object of this invention to provide a novel and improved electrical raceway including a retaining clip formed with similar opposed curved lateral projections which is easily installed on the wall of a building in combination with a cover member having a central section in which electrical outlets can be positioned and having co-planar opposed lips securely positioned against the wall both above and below the retaining clip when the cover member is installed.

It is still another important object of this invention to provide a novel and improved electrical raceway according to any of the preceding objects wherein the cover member is scored on its back side to facilitate cutting the outlet opening and wherein end and corner members are provided to attractively finish the raceway at such locations.

Further objects and advantages will appear from the following descriptions and drawings; wherein, FIGURE 1 is a perspective view of one preferred form of an electrical raceway incorporating this invention illustrating the raceway installed as a baseboard;

FIGURE 2 is a view similar to FIGURE 1 with a cover member removed to illustrate the mounting arrangement;

FIGURE 3 is a fragmentary section through one of the electrical outlets illustrating the structural detail of the raceway and outlet mounting;

FIGURE 4 is a view similar to FIGURE 3 showing a modified form wherein the profile of the baseboard differs from the structure illustrated in FIGURES 1 through 3;

FIGURE 5 is a cross-section of one form of chair rail incorporating this invention;

FIGURE 6 is a perspective view of another embodiment of this invention provided with end and corner members to attractively finish the raceway at such locations;

FIGURE 7 is a fragmentary back view of the cover member of FIGURE 6 illustrating the scoring on the back side of the cover member to facilitate the cutting of an outlet opening;

FIGURE 8 is a cross-section taken along 8—8 of FIGURE 7;

FIGURE 9 is a fragmentary perspective view of an outside corner member illustrating how it is assembled on the end of a cover member and secured by the clip member;

FIGURE 10 is a perspective view of an inside corner member;

FIGURE 11 is a perspective view of an end member; and,

FIGURE 12 is a fragmentary plan view of an end member illustrated in FIGURE 11 installed at the end of a cover member.

Referring to FIGURES 1 through 3, a retainer clip 10 is preferably formed of extruded rigid vinyl plastic having a flat central portion 11 adapted to fit tightly against a wall 12 when secured thereto by any suitable fastening means, such as nails, staples or screws. As illustrated in FIGURE 2, the retaining clip 10 is mounted against the wall by nails 13 spaced along the length of the retaining clip usually at the wall studs. The retaining clip is formed with two lateral curved projections 14 and 16, with one extending along each side of the central portion 11 and formed to join the central portion with a smooth curve at the junctions 17 and 18.

The projections are substantially semicircular in profile and curve away from the junctions 17 and 18 in a diverging manner to mid-points 19 and 21 on the projections 14 and 16 where the projections provide the maximum spacing. Beyond the mid-points 19 and 21 the projections continue to curve in a converging manner to edges 22 and 23 which are spaced apart a distance substantially equal to the spacing between the junctions 17 and 18.

A cover member 24 is removably mounted on the retaining clip 10. In the embodiment of FIGURES 1 through 3 the cover member is formed with a flat face portion 26 extending from 27 to 28. At the point 28 the face portion joins a rearwardly extending substantially horizontal face 29 extending back to a vertical wall 31 which cooperates with the face 28 to provide an off-set to receive the edge of a carpet 32, as illustrated in FIGURES 1 and 2.

Extending from the lower end of the wall 31 the cover member is formed with a rearwardly extending face 33 adapted to fit against the floor 34 of the room and join at its rearward end with an upstanding lip 36. At the upper edge 27 of the face 26 the cover member is joined with a curved section 37 joining with a downwardly extending lip 38 which is co-planar with the lip 36. The two lips 36 and 38 terminate in opposed edges 39 and 41, respectively, which are spaced apart when the cover member is unstressed by a distance preferably slightly less than the distance between the junctions 17 and 18.

Preferably, both the retainer clip and the cover member 24 are extruded from a rigid vinyl which provides sufficient elasticity or deformability to permit the cover member 24 to be snapped over the mid-points 19 and 21 to the illustrated position wherein the edges 39 and 41 tightly press against the retainer member at the junction between the central portion 11 and the curved projections 14 and 16 and the lips 36 and 38 are held tightly against the wall 12. When the cover member 24 is installed, as illustrated in FIGURE 1, no fastening means for the cover member are exposed and a smooth uninterrupted decorative appearance is provided. If desired, the plastic forming the cover member 24 may be colored in any suitable manner to provide a permanent easily cleaned finish. However, if desired, the cover member may be painted and since it provides a good base for all normal paints no special treatment is necessary. Because rigid vinyl is exceedingly tough and substantially mar proof the appearance of the raceway does not deteriorate with time or use. Further, the surface is normally washed with a damp cloth or with soap and water.

Because the base 33 of the cover member 24 extends below the retainer clip the clip 10 is mounted spaced from the floor 34 a distance proportioned so that the base 33 fits along the floor 34. By providing a carpet offset the need of any base shoe, or the like, is completely eliminated and a very neat appearance is provided, particularly the edge of the carpet is covered, thus hiding and protecting any rough or frayed edges.

One or more electrical conductors 47 are brought through the wall 12 to an opening 46 in the clip 10, as illustrated in FIGURE 2. This opening can be located anywhere along the retaining clip where easy access for drawing the wire is available. The opening 46 is usually cut after the clip is mounted. The wire is positioned along the retaining clip and is preferably stapled in place. The conductors 47 may be of any suitable surface wiring type.

At any desired location along the raceway an electrical outlet 48 may be mounted. The outlets 48 are connected to the conductors 47 in the normal manner, leaving a slight slack for adjustment of the location of the outlets 48. An opening 49 is cut in the face portion 26 of the cover member 24. Preferably, the opening 49 is cut by a shaped punch proportioned to cut the opening to closely fit around the outlet 48. The cover member is then snapped into position with the outlet 48 projecting through the face portion 26 as illustrated. This provides exact location of the outlet with respect to the opening 49. Screws 51 for mounting the outlet are then driven through the retainer clip 10 securely mounting the outlet with its rearward face against the central portion 11 of the retainer clip. This procedure insures that the outlets 48 are exactly positioned with respect to the openings 49. Thereafter, whenever the cover member 24 is removed the outlets remain in position mounted on the retaining clip 10. The lateral width of the cover member is proportioned so that the outlet 48 will project through the face portion 26 slightly, as illustrated.

As illustrated in FIGURE 2, the retaining clip 10 is preferably mounted so that it is spaced slightly from the corner 52. One of the cover members is then notched at 53 so that the conductor 45 can pass around the corner. The end of the second cover member is mitered in the usual manner for baseboard installation so that it fits against the first baseboard cover along the curved profile. Since the retainer clip and cover member are formed of plastic simple carpentry tools such as saws and miter boxes can be used to cut the pieces to length. In addition to the conductors 45 telephone cables and television antenna lines may be strung along the retainer clip as desired.

FIGURE 4 shows another embodiment of this invention wherein the cover member is provided with a more classic profile. The cover member 56 of this embodiment is again formed with coplanar lips 57 and 58 which connect to the retainer member 10 in the manner identical to the embodiment of FIGURES 1 through 3. Here again, the lower portion of the cover member is formed with a base wall 59 adapted to fit along the floor.

In FIGURE 5 still another embodiment of this invention is illustrated. This embodiment is particularly suited for use as a chair-rail raceway. The cover member 61 is again formed with co-planar opposed lips 62 and 63 which provide opposed edges which connect to the retainer clip 10 in the same way as the other embodiments. In this type of installation the retainer clip 10 is mounted at a chair-rail height substantially above the floor. In all three embodiments the cover members removably mount upon the retainer clip 10. Preferably all embodiments are proportioned so that a single retainer clip can be used for all embodiments, thus reducing tool, die and inventory cost. In each embodiment the cover member is formed with a flat surface substantially parallel to the clips through which the outlet 48 projects. Also, for standardization it is desirable to provide the same depth for each cover member so that one size of outlet can be used in any embodiment.

FIGURES 6 through 12 disclose another form of this invention in which a cover member is scored on the back side at spaced points along its length to facilitate the cutting of the outlet opening with a knife or other similar simple hand tools. In addition, this form of the invention includes corner members and end members which are installed at appropriate locations to provide an attractive appearance without the use of miter cuts or the like.

In FIGURE 6 a left end member 71 is mounted at one end of the raceway covering the adjacent end of the cover member 72 and closing the end of the raceway. The retaining clip 11 is used to secure both the cover member 72 and the end member 71 in position. An inside corner member 73 is mounted by the retainer clips 11 and covers the adjacent ends of two cover members 72 at the inside corner 74. An outside corner member 76 fits around an outside corner 77 and is also retained in place by the adjacent retaining clips 11. Finally, a right hand end member 78 is mounted on the right end of the cover member 72 to close that end.

Referring now to FIGURES 7 and 8. The cover member 72 is formed with a forward flat face 79 and opposed co-planar lips 81 and 82 proportioned to snap over the retaining clip 11 as described above. In this form, however, the rearward side of the forward face is rectangularly scored with a groove 83 which extends about one half of the way through the wall.

The scoring or grooves 83 do not show on the forward face of the wall 79, so they do not appear in the installed raceway. However, when it is desired to cut an opening for an outlet 84 the installer merely cuts along the grooves 83 with a knife to produce the required outlet opening 86. The scoring is shaped and sized so that when an opening 86 is cut it fits tightly around the installed outlet 84. Preferably, the cover member 72 is scored at intervals along its length, such as two foot intervals, so that an outlet can be located at substantially any desired location along the length of the raceway. The use of the scoring eliminates the requirement of a special punch and is desirable in certain instances.

The exterior corner member 76 is illustrated in FIGURE 9. This corner member 76 is formed with perpendicular front faces 87 which join at their upper ends with curved sections 88 and at their bottoms with horizontal sections 89. The bottom sections 89 terminate at an edge 91 spaced inwardly from the edges 92 so that the end 93 of the cover member 72 extends behind the adjacent front face 87 and curved portion 88, as illustrated in FIGURE 9. Consequently, the end of the cover member 72 is enclosed. Since the edge 92 is formed as a finished edge and the ends of the cover member 72 may be somewhat rough from cutting a clean smooth appearance is provided.

The corner member 76 is provided with right angle depending lips 94 and 96 which cooperate with similar upstanding lips 97 and 98 to fit behind the mounting clips in a manner similar to the lips 81 and 82 of the cover member 72. In FIGURE 9 a mounting or retaining clip 11 is illustrated in phantom and extends to a location 99 behind the lips 96 and 98 when the exterior corner member is installed. A similar retaining clip (not shown) projects along the retaining lips 94 and 97 and the end of the adjacent cover member (not shown) extends behind the other face 87 past the edge 92. In this manner the exterior corner member 76 is secured to an exterior corner 77, as illustrated in FIGURE 6.

The interior corner member 73 is mounted in a manner similar to the exterior corner member. As illustrated in FIGURE 10 the interior corner member is provided with opposed co-planar mounting lips 101 and 102 along one section and similar lips 103 and 104 extending at right angles therefrom. Here again, the mounting lips terminate inward from the edges 106 and 107 of the front walls so that the adjacent end of the associated cover member 72 fits behind the front walls while the corner member is held in place by the end of the adjacent retaining clip in the same manner as the exterior corner member 76.

Referring now to FIGURES 6, 11 and 12, the right end members 71 and 78 are closed at its end by a curved end wall 108 which extends back flush with the opposed retaining lips 109 and 111. The ends of the retaining lips 109 and 111 terminate at an edge 112 spaced axially along the member from the edge 113 of the forward face 114. As illustrated in FIGURE 12 the mounting clip 11 extends past the end 116 of the cover member 72 along the end member 78 to the point 117. Consequently, the retaining clip 11 extends along the opposed lips 109 and 111 to secure the end member in its mounted position. Here again, the edge 113 is spaced axially along the cover member 72 from its end 116 and provides a neat appearance.

If desired, a straight joining member can be utilized to cover the ends of the cover members at intermediate locations along the wall if the cover member is not long enough to cover a single run. In such instance the joining member is formed to overlap both adjacent ends of the cover members and be retained by coplanar opposed lips spaced inward from both end edges of the joining member. This particular structure is not illustrated, since the mode of operation as the same at the end and corner cover members.

The various structures of the end members 71, 73, 76 and 78 are arranged to extend over the adjacent end of the cover member to conceal any rough edge which may result from the cutting of the cover member and to provide a neat appearance. The structure of each is such that sufficient flexibility is provided to allow the snapping of the members over the retaining clips to removably mount the end and corner members in the installed position.

It should be understood that the embodiments illustrated do not in any way limit the different decorative forms that can be produced and are only intended to illustrate several possible decorative forms. It should also be understood that although rigid vinyl is one preferred material for forming the cover member and retainer clip that other materials may be used. Still further, substantially any surface mounting type outlet can be utilized.

Although preferred embodiments of this invention are illustrated, it is to be understood that various modifications and rearrangements of parts may be resorted to without departing from the scope of the invention as defined in the following claims.

What is claimed is:

1. A raceway comprising a wall, an extruded substantially uniform wall thickness elongated retaining clip having a flat central section mounted on said wall and formed with opposed laterally extending smoothly curved semi-circular projections cooperating with said wall to form opposed retaining grooves adjacent said wall, said curved projections blending with said central section and terminating in opposed edges spaced a distance substantially equal to the width of said central section, a uniform wall thickness extruded cover member having a generally channeled shape and opposed co-planar lips positioned in said retaining grooves locking said cover member against said wall on both sides of said retaining clip, electric conductors extending along said retaining clip, and electrical outlets extending through said cover member having a back face with a vertical height less than the width of said central section, said outlets being secured to said central section by means independent of said cover member.

2. An electrical raceway comprising an extruded uniform wall thickness elongated retaining clip formed with a flat central portion adapted to be mounted against a wall and opposed semicircular lateral projections blending into said central portion and extending from opposite sides thereof, a uniform wall thickness extruded cover member having a face section and a pair of lateral sections each terminating in an inwardly extending flat lip co-planar with the other lip, said lips terminating in opposed edges having a spacing at least substantially as short as the width of said central portion when said cover member is unstressed, said cover member and retaining clip being formed of material permitting deflection for snapping said edges over said lateral projections until said lips are secured against the wall on which the retaining member is mounted with the edges against the junction of said central portion and the lateral projections of said retaining clip whereby said cover member is tight against said wall on both sides of said clip, an electrical outlet having a vertical height less than the width of said central portion, means independent of said cover member adapted to secure said outlet to said central portion of said retaining clip, said electrical outlet being adapted to closely fit through openings in said face section, and electrical conductors adapted to extend within said cover member and connect with said outlet.

3. An electrical raceway comprising an extruded uniform wall thickness elongated retaining clip adapted to be mounted on a wall surface spaced from the floor and ceiling, said clip having a uniform profile including a flat central portion adapted to firmly engage the wall and similar and opposite curved lateral projections extending from opposite sides of said central portion, said lateral projections smoothly blending with the adjacent edge of said central portion with a curve diverging to a midsection having a maximum spacing from the other midsection and then continuing with converging curves to edges spaced from each other by a distance at least substantially equal to the width of said central portion, an extruded uniform wall thickness elongated cover member of uniform profile having opposed lateral projections each terminating in a substantially flat lip co-planar with the opposite lip, said lips having opposed edges spaced apart a distance at least as short as the width of said central portion when said cover member is unstressed, the lateral projections of said cover member having a greater lateral length than the lateral projections of said retaining clip, said clip and member being formed of material permitting deflection for snapping said opposed edges past the midsections so that said opposed edges engage the retaining clip adjacent the side of said central portion holding said lips against the wall, and electrical outlets having a rearward width less than the width of said central portion adapted to be secured to said central portion by means independent of said cover member, said electrical outlets being formed with a forward face adapted to project through closely fitting openings in said cover member, and electrical conductors adapted to extend along said retaining clip to connect said outlets.

4. An electrical raceway comprising a wall, an elongated retaining clip formed with a flat central portion mounted against said wall and opposed curved projections extending from opposite sides of said central portion, a cover member having a face section generally parallel to said central portion and a pair of lateral sections each terminating in an inwardly extending flat lip coplanar with the other lip, said lips terminating in opposed edges having a spacing at least substantially as short as the width of said central portion when said cover member is unstressed, said lips fitting into grooves formed by said wall and the lateral projections of said retaining clip and mounting said cover member against opening in said face section, an electrical outlet closely fitting through said opening in said face section, means independent of said cover member securing said outlet to said retaining clip, and electrical conductors extending within said cover member connected to said outlet.

5. An electrical raceway comprising an extruded elongated retaining clip formed with a flat central portion adapted to be mounted against a wall and opposed curved lateral projections blending into said central portion and extending from opposite sides thereof, an extruded cover member having a face section and a pair of lateral sections each terminating in an inwardly extending flat lip co-planar with the other lip, said lips terminating in opposed edges having a spacing at least substantially as short as the width of said central portion when said cover member is unstressed, said cover member and retaining clip being formed of material permitting deflection for snapping said edges over said lateral projections until said lips are secured against the wall on which the retaining member is mounted with the edges against the junction of said central portion and the lateral projections of said retaining clip whereby said cover member is tight against said wall on both sides of said clip, an electrical outlet having a vertical height less than the width of said central portion, means independent of said cover member adapted to secure said outlet to said central portion of said retaining clip, the rearward side of said face section being scored partially therethrough to facilitate cutting an opening therethrough, said electrical outlet being proportioned to closely fit an opening cut along the scoring, and electrical conductors adapted to extend within said cover member and connect with said outlet.

6. A method of installing an electrical raceway comprising mounting a retaining clip on a wall, stringing electrical conductors along said clip, connecting an outlet adapted to fit in said retaining clip to said conductors with sufficient slack to permit limited axial movement of said outlet along said clip, cutting an opening in a cover member adapted to snap on said retaining clip at the approximate location of said outlet, said opening being shaped to closely fit said outlet, snapping said cover on said retaining clip while adjusting said outlet into said opening, and thereafter securing said outlet to said retaining clip while said cover is in place thereby locking said outlet in position in said opening.

7. An electrical raceway comprising an elongated retaining clip formed with a flat central portion adapted to be mounted against a wall and opposed curved projections extending from opposite sides of said central portion, a cover member adapted to be mounted on said retaining clip with a face section generally parallel to said central portion, said cover member having a pair of lateral sections extending from said face section each terminating in an inwardly extending flat lip co-planar with the other lip, said lips terminating in opposed edges having a spacing at least substantially as short as the width of said central portion when said cover member is unstressed, said lips being adapted to fit into grooves formed by said wall and the lateral projections of said retaining clip to mount cover member against said wall on both sides of said retaining clip, an opening in said face section, an electrical outlet adapted to closely fit through said opening in said face section, means independent of said cover member adapted to secure said outlet to said retaining clip, and electrical conductors adapted to extend within said cover member and connect to said outlet.

8. An electrical raceway as set forth in claim 7 including an end member formed with opposed co-planar lips adapted to fit into grooves formed by said wall and the lateral projections of said retaining clip and mount said end member against said wall on both sides of said retaining clip, said end member being formed with an exterior surface extending past its lips adapted to fit over and cover the exterior surface of the end of said cover member when both of said members are mounted on said retaining clip, said end clip being formed of a material permitting its lips to be removably snapped over said retaining clip.

9. A raceway as set forth in claim 8 wherein said end member is formed with oppositely exterior surfaces each adapted to fit over and cover the end of an adjacent cover member.

10. A raceway as set forth in claim 9 wherein said end member is formed with similar portions extending at right angles to each other and is adapted to fit a wall corner.

References Cited by the Examiner
UNITED STATES PATENTS

| | | |
|---|---|---|
| 1,143,283 | 6/1915 | Knapp. |
| 1,701,415 | 2/1929 | McBride. |
| 1,995,855 | 3/1935 | Lee et al. _____ 339—23 X |
| 2,137,536 | 11/1938 | McConnell _____ 339—22 X |
| 2,239,652 | 4/1941 | Morten et al. _____ 339—23 |
| 2,441,698 | 5/1948 | Gerspacher et al. _____ 339—23 |
| 2,515,255 | 7/1950 | O'Brien et al. _____ 339—23 X |
| 2,751,665 | 6/1956 | De Roovere _____ 29—155.5 |
| 2,845,693 | 8/1958 | Shetterly et al. _____ 29—155.5 |
| 3,171,702 | 3/1965 | Schumacher et al. ____ 339—22 |

FOREIGN PATENTS

| | | |
|---|---|---|
| 2,694/26 | 7/1926 | Australia. |
| 950,028 | 3/1949 | France. |
| 569,697 | 6/1945 | Great Britain. |

OTHER REFERENCES

Wiremold Catalog and Wiring Guide, No. 18, received April 11, 1957, page 12.

National Electric Products Corporation Catalog and Handbook, 1938, page 43.

PATRICK A. CLIFFORD, *Primary Examiner*.